United States Patent [19]
Brothers et al.

[11] Patent Number: 5,934,313
[45] Date of Patent: Aug. 10, 1999

[54] FLUID FLOW CONTROL VALVE

[76] Inventors: Andrew Mark Brothers, Rittersee Strasse 6 D-64846, Gross-Zimmern, Germany; David John Horton, Octagon, Windmill Hill, Rough Close, Stoke-on-trent, Staffordshire, United Kingdom, ST3 7Pl

[21] Appl. No.: 08/981,155
[22] PCT Filed: Jun. 13, 1996
[86] PCT No.: PCT/GB96/01405
§ 371 Date: Mar. 3, 1998
§ 102(e) Date: Mar. 3, 1998
[87] PCT Pub. No.: WO96/41981
PCT Pub. Date: Dec. 27, 1996

[30] Foreign Application Priority Data

Jun. 13, 1995 [DE] Germany .................................. 9511990

[51] Int. Cl.⁶ ..................................................... F16K 35/00
[52] U.S. Cl. ................... 137/351; 137/384.2; 137/384.8; 251/68; 70/242
[58] Field of Search .................................. 137/351, 384.8, 137/384.2, 554, 301, 383; 70/242; 251/68, 70

[56] References Cited

U.S. PATENT DOCUMENTS

| | | | |
|---|---|---|---|
| 3,670,836 | 6/1972 | Tonkowich et al. | 180/114 |
| 3,747,378 | 7/1973 | Hiatt | 70/257 |
| 3,776,263 | 12/1973 | Hubenthal | 137/384.8 |
| 3,792,712 | 2/1974 | Fontana | 137/384.2 |
| 3,838,587 | 10/1974 | Good | 70/243 |
| 4,891,994 | 1/1990 | Barba | 74/2 |

Primary Examiner—A. Michael Chambers
Assistant Examiner—Paul Coryea
Attorney, Agent, or Firm—Renner, Kenner Greive, Bobak, Taylor & Weber

[57] ABSTRACT

A fluid flow control valve suitable for fitting to the fuel line (16, 18) of an internal combustion engine has a valve member (12) and a spring (14) urging the valve member (12) to a closed position where the valve member seals against a valve seat (13). A key-actuated setting mechanism (20, 21) allows the valve member (12) to be moved away from its closed position to an open position and a latch (31, 32) then holds the valve member in that open position. An electrically operated release (33) moves the latch (31) to free the valve member and permits the valve to close under the action of the spring (14). When fitted to a vehicle, energy may be provided to the release (33) automatically whenever the vehicle is left unattended so as to immobilise the vehicle.

25 Claims, 5 Drawing Sheets

FLUID FLOW CONTROL VALVE

This invention relates to a fluid flow control valve and, in preferred aspects, to a fluid flow control valve in combination with an immobilizing system for a motor vehicle, and to a method of protecting against theft a vehicle powered by an internal combustion engine.

It is known to provide a motor vehicle powered by an internal combustion engine with a fuel flow shut-off valve, whereby operation of the engine is inhibited until the valve has been opened. In an attempt to make it significantly more difficult for an unauthorised person to start the engine of the vehicle, there have been proposals to fit such a valve with a key-operated mechanism, whereby opening and closing of the valve may be achieved only by use of an appropriate key for the mechanism. Though in principle this will increase the security against theft of the vehicle, it does have the disadvantage that a driver of the vehicle has to insert the key into the lock mechanism and operate that mechanism to close the valve, when the vehicle is to be left for any significant period of time. Though it may be simple and take only a relatively short time to effect closing of the valve with a key, experience shows that people are reluctant to undertake this extra step on leaving a vehicle, and so the vehicle often will not benefit from having a security fuel flow shut-off valve fitted to the engine.

In an attempt to overcome the above disadvantage associated with the use of the known kind of fuel flow shut-off valve fitted with a key-operated lock mechanism, the present invention provides a fluid flow control valve including a fluid passage in which is provided valve seat, a valve member and a spring urging the valve member to a closed position where the valve member seals against the valve seat, the valve further comprising a key-actuated setting mechanism arranged upon operation with a key to move the valve member away from the closed position to an open position, latch means to-restrain the valve member in the open position when moved there by the setting mechanism, and electrically-operable release means for the latch means whereby operation of the release means frees the valve member to move under the action of the spring from the open position to the closed position.

Though it will be appreciated that the fluid flow control valve of the present invention may be used in a variety of situations where a security fluid flow valve may be required, the valve is particularly suitable for use as a fuel flow shut-off valve for an internal combustion engine. The engine may be installed in a motor vehicle, such as a car, truck or lorry; equally, the engine could be installed to power a boat or aeroplane. The term "vehicle" as used herein should thus be interpreted broadly, to cover all of these possible internal combustion engine powered modes of transport.

With the fluid flow control valve of the present invention, once the valve has been closed by the electrically-operable release means, a key has to be used to cause actuation of the setting mechanism if fluid flow is required once more. In the case of the valve being installed to control the fuel flow to an internal combustion engine of a vehicle, the valve may be opened only by use of the key whenever the engine is to be operated, following closing of the valve by the release means. It is therefore preferred for the electrically-operable-release means to be connected to the electric circuits associated with the vehicle in which the engine is installed so that closing of the valve is performed automatically, whenever at least one pre-determined electrical system of the vehicle is turned off. In this way, the valve may be arranged to ensure a driver of the vehicle cannot prevent closing of the valve on leaving the vehicle, and the driver and must take positive action with the appropriate key, whenever the vehicle is thereafter to be started.

In one particular embodiment of the fluid flow control valve of this invention, the valve member is in the form of a spool arranged for linear sliding movement towards and away from the valve seat. In this case, the latch means may comprise a plunger mounted for movement in a direction substantially perpendicular to the line of movement of the valve member, the plunger being engageable with the valve member to hold the valve member in its position where the valve is open. Preferably, the plunger is spring-urged to a position where the plunger is engaged with the valve member, and the release means comprises a solenoid arranged to act on the plunger, to move the plunger against the spring bias, so freeing the valve member to move under its spring bias to its position where the valve is closed.

The setting mechanism may be purely mechanical, and take the form of a key-operated lock mechanism connected to the valve member. Alternatively, the setting mechanism may be electrically operated, for example having a solenoid which is arranged, when energised, to cause movement of the valve member to its open position. In such a case, the supply of electrical energy to the setting mechanism may be under the control of a key-operated switch, so that the operator has to use the key to open the valve. Another possibility is for the supply of electrical energy to be under the control or a vehicle immobiliser system, which system may be operated only with the use of an appropriate key. Such a key may be a conventional mechanical key which may be inserted into a lock, or could be in the form of a card or other data carrier which may be read electronically by the immobiliser system. A so-called "smart card" is particularly suitable for this purpose, where the card carries an integrated circuit pre-programmed with information.

For the case of a mechanical key-operated lock mechanism, the key may be restrained against withdrawal from the mechanism other than when the mechanism is at a first position, and movement of the mechanism from the first position to a second position serving to open the valve. As the valve member is then latched at the second position, the lock mechanism may be returned to its first position to permit withdrawal of the key. By closely associating the key for the lock mechanism with the "ignition" key for operation of the engine, for example by mounting both keys on the same key ring, before the engine can be started, the operator has to turn the lock mechanism back to its first position to withdraw the key. This ensures that the valve member can move to its position where the valve is closed when next the electrical release means is operated; in turn this ensures that a key must be used to open the valve, the next time the engine is to be started.

The fluid flow control valve may include electrical contact means arranged to detect manual opening of the valve. Such contact means may be connected to an external circuit, such as an immobilising system of a motor vehicle, to control the operation thereof. In addition, there may be provided further contact means to detect return of the key to the first position or the removal of the key, following opening of the valve with the key.

This invention extends to a fluid flow control valve of this invention as described above, in combination with an iummobilizing system for a motor vehicle, the immobilising system being disarmed by the contact means detecting opening of the valve by use of the key, then to permit operation of a vehicle to which the valve and immobilising system is connected.

In the case of such a combination, the electrically-operated release means preferably is powered to release the latch means by an activity associated with a driver leaving the vehicle. For example, that activity may be one or more of turning off the ignition supply to the engine, closing all of the doors of the vehicle with the engine already turned off within some preset period beforehand, and locking the doors of the vehicle.

This invention extends to a method of protecting against theft a vehicle powered by an internal combustion engine, comprising installing in the fuel line to the engine a fluid flow control valve having open and closed positions, the fluid flow control valve having a key-operated setting mechanism for opening of the valve and electrical release means to close the valve, and connecting the electrical release means to the vehicle electrical systems so as to be energised automatically upon the vehicle being left unattended. Preferably, a vehicle electrical immobilising system is connected to the electrical circuits of the vehicle and is also arranged to detect opening of the valve by use of the key, so as then to allow operation of the vehicle.

By way of example only, two specific embodiments of fluid flow control valve constructed and arranged in accordance with the present invention and intended for use in association with a vehicle immobilising system, to control operation of both the vehicle and its engine, will now be described in detail, reference being made to the accompanying drawings, in which.

Figure 1:
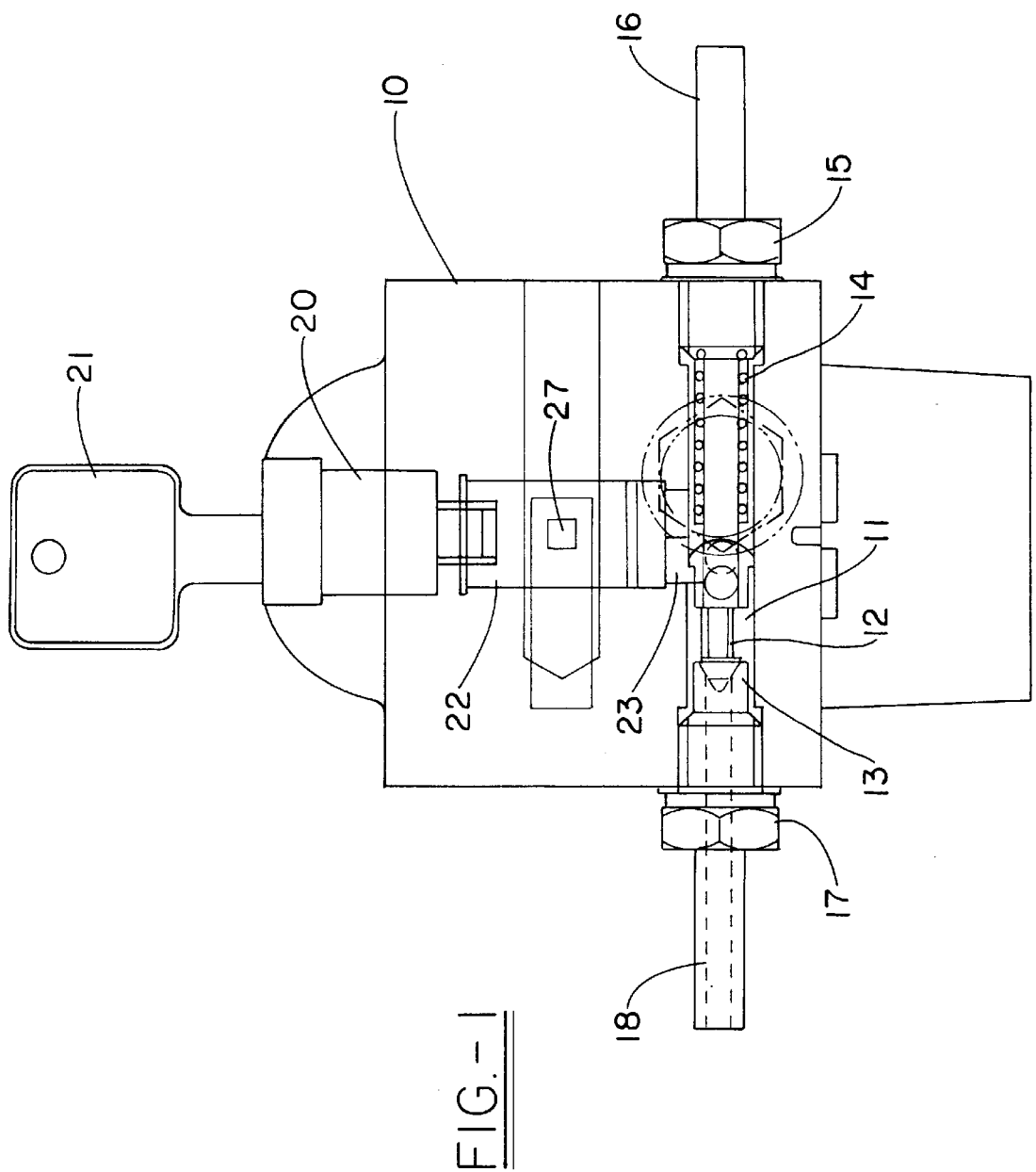
FIG. 1 is a diagrammatic, part-sectional view through the valve.
Figure 2:
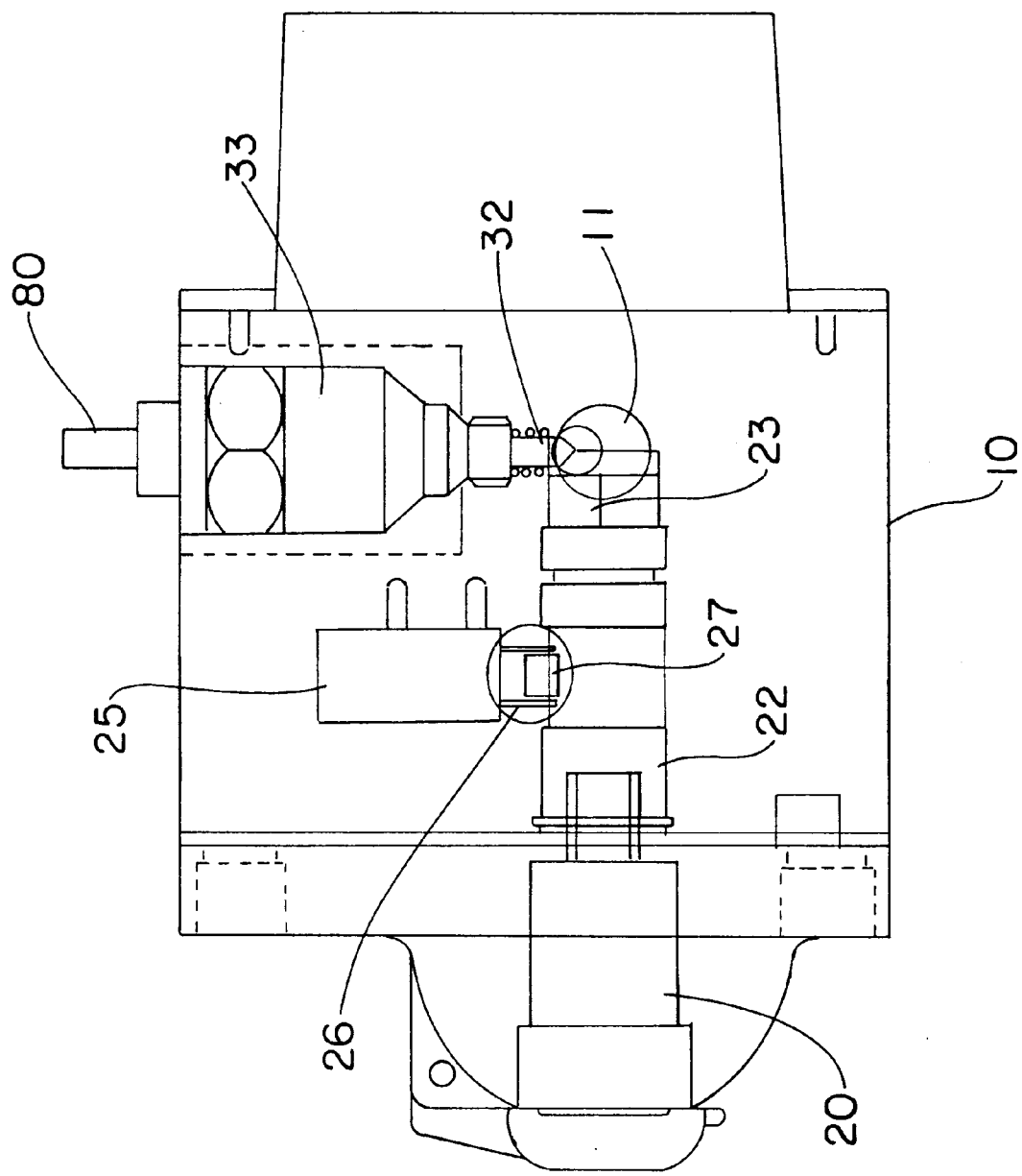
FIG. 2 is a diagrammatic, part-sectional view through the valve of FIG. 1 and taken on arrow A marked on FIG. 1.
Figure 3:
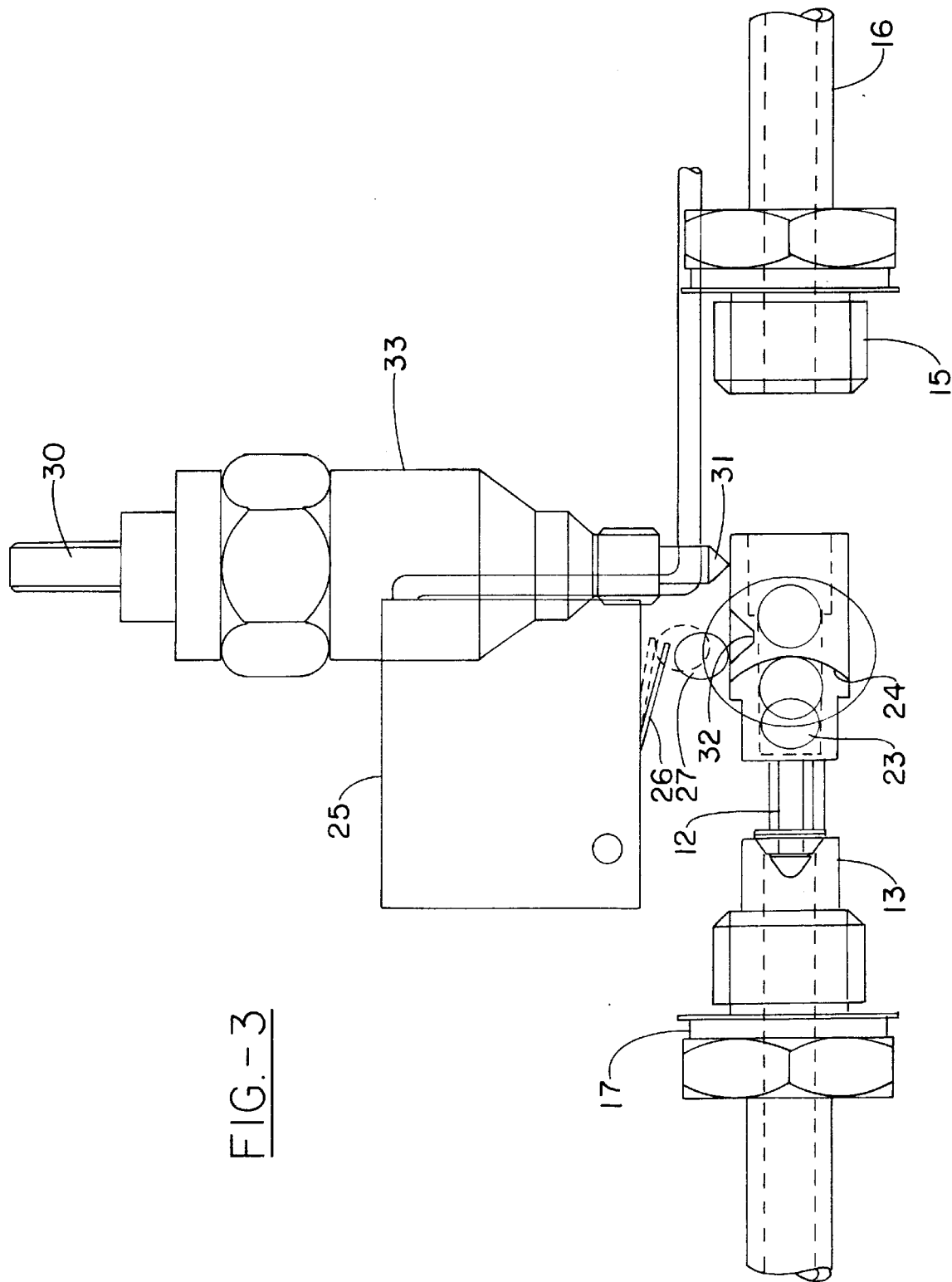
Figure 4:
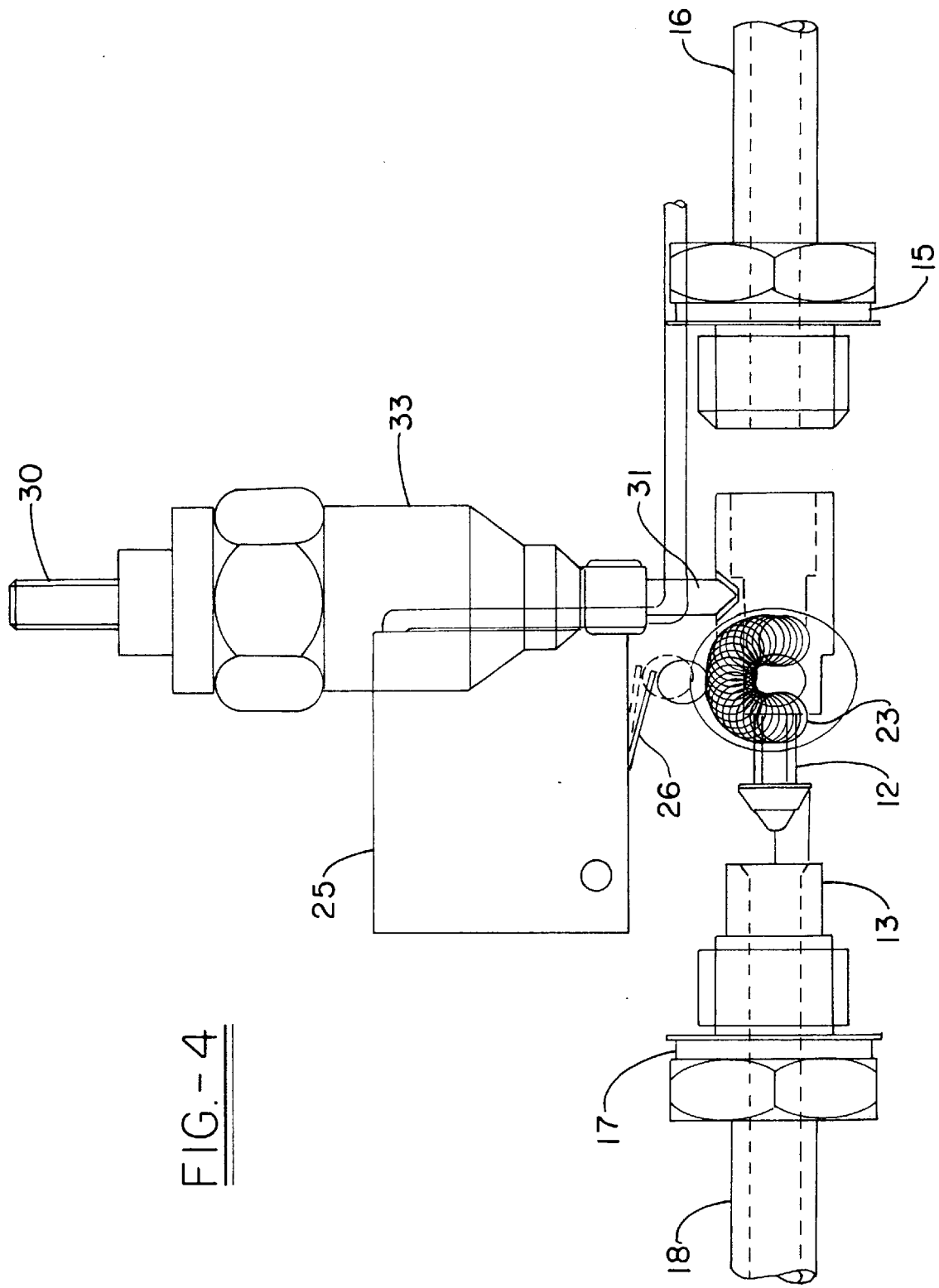
Figure 5:
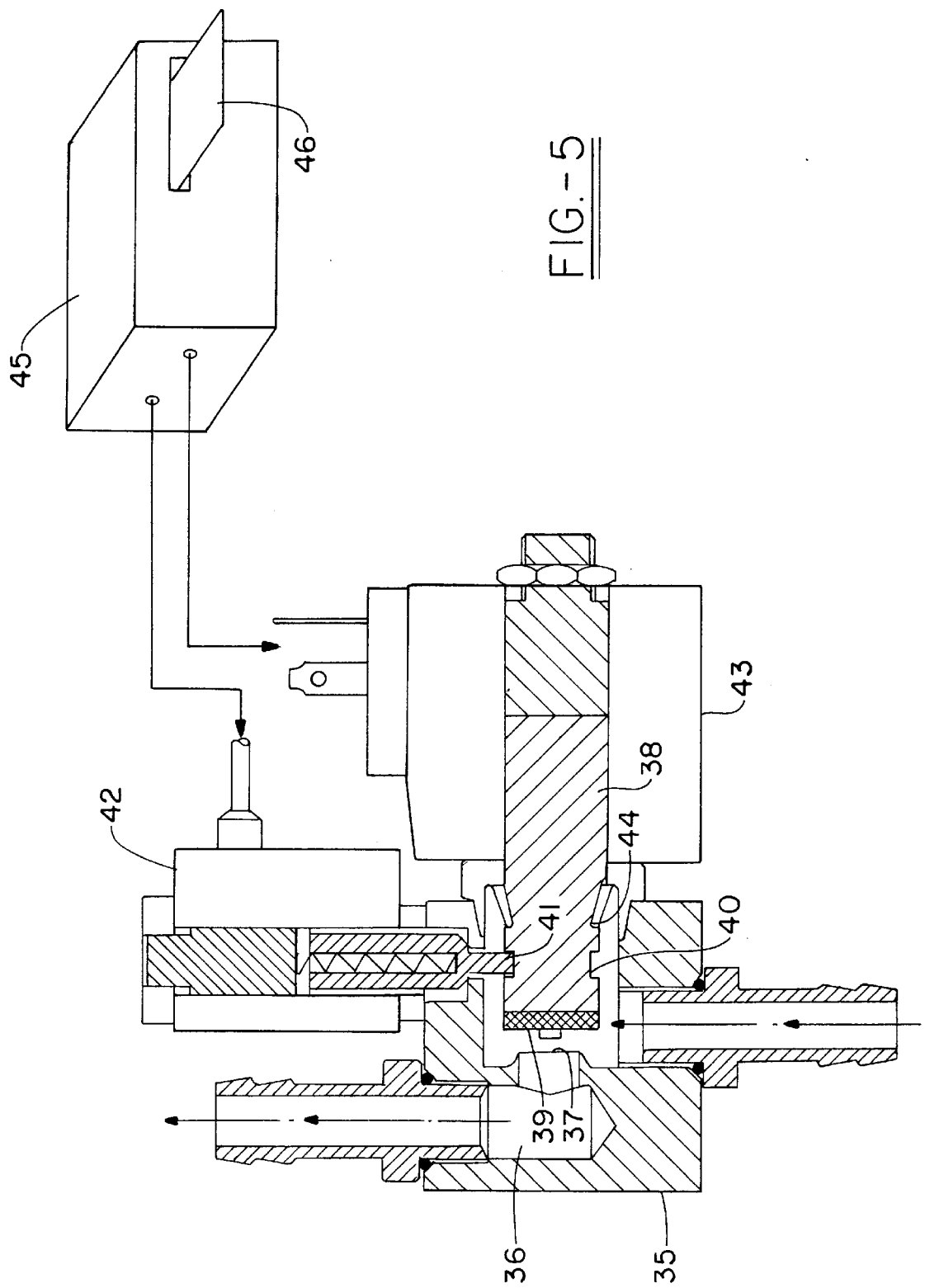

FIGS. 3 and 4 diagrammatically show the important component parts of the valve of FIGS. 1 and 2, when respectively closed and opened; and FIG. 5 diagrammatically shows a second embodiment of fluid flow control valve of this invention and having an electrical setting machanism.

Referring initially to FIGS. 1 and 2, the fluid flow control valve comprises a mainbody 10 in which there is defined a fuel flow passageway 11, a valve member 12 being slidably mounted in the passageway 11 and co-operating with a valve seat 13 threaded into a counterbore at one end of the passageway 11. Spring 14 acts between the valve member 12 and union 11 threaded into the opposite end of the passageway 11, so as thereby to bias valve member 12 into engagement with the valve seat 13. Union 15 serves to connect an inlet fuel pipe 16 to the mainbody 10, and valve seat 13 is formed as part of a union 17 which serves to connect a fuel outlet pipe 18 to the main body 10.

A security lock mechanism 20 is mounted within the main body 10 and is operable by means of a key 21 unique to that lock mechanism 20. The lock mechanism 20 is drivingly coupled to a camshaft 22 having an eccentric peg 23 at its end remote from the lock mechanism 20. That peg 23 lies within the passageway 11 and is engageable with an arcuate surface 24 formed on the valve member 12. FIG. 3 shows the peg at its initial position with the valve member closing the valve seat 13. Rotation of the lock mechanism 20 by means of the key 21 turns the camshaft 22 in the clockwise sense, so moving peg 23 to the right. This acts on arcuate surface 24 of the valve member and so moves the valve member to the right, opening the valve.

A microswitch 25 is mounted within the main body 10 and has an operating lever 26 provided with a cam follower 27 resting on the camshaft 22. The camshaft has a cam profile which interacts with the cam follower 27, thereby to actuate the microswitch 25. The arrangement is such that the contacts of the microswitch are closed when the lock mechanism is in its initial position, as illustrated in FIG. 3.

A latch mechanism is provided to hold the valve member 12 in its valve-open position, that latch mechanism including a plunger 30 mounted for movement radially of the passageway 11 and spring-urged to a position where the free end 31 of the plunger projects into the passageway. The valve member 12 has an annular recess 32 into which the free end 31 of the plunger may locate, when the valve member 12 is lifted off the valve seat 13.

A solenoid 33 is located in a bore in the main body 10, the plunger 30 extending through the solenoid. Energisation of the solenoid pulls the plunger out of the passageway 11, so freeing the valve member 12 to move under the influence of spring 14 back to the initial position where the valve seat 13 is closed.

The fluid flow control valve described above is intended to be fitted in the fuel line to an internal combustion engine installed within a vehicle, which also is fitted with a vehicle immobilising system. The microswitch 25 is arranged to supply an input to the immobilising system and the solenoid 33 is controlled by that immobilising system.

When the immobilising system is fully armed, the solenoid 33 is briefly energised in order to lift the plunger 30 and so free the valve member 12 to close the valve seat 13. Fuel cannot then be supplied to the engine. When the engine is to be operated, a key 21 must be used to operate the lock mechanism 20, manually to lift the valve member 12 away from valve seat 13. The valve member 12 is latched in that lifted position by the free end 31 of the plunger 30 engaging in the annular groove 32. Turning the key back to the initial position will close the contacts of the microswitch 25. This closing action is detected by the immobilising system, which then disarms those circuits of the vehicle rendered inactive by the armed immobilising system. Thereafter, the engine may be started and the vehicle driven in the usual way.

The immobilising system should operate on at least two separate electrical circuits of the motor vehicle. For example, when armed, the immobilising system may protect both the starter motor circuit and the ignition circuit. Those circuits are rendered active once more when the key is used to open the valve.

The immobilising system should provide the required pulse to the solenoid 33 to lift the plunger 30 following the detection of certain pre-defined activities associated with the driver leaving the vehicle. For example, the pulse may be provided when the doors are locked some preset period after the engine has been turned off.

FIG. 5 shows a second embodiment of fuel flow control valve of this invention, which uses an electrically operated setting mechanism indirectly controlled by a key. The valve comprises a valve body 35 in which is formed a fuel flow passage 36 and defining a valve seat 37 against which a valve member 38 may seal in order to close the valve. The valve member 38 is arranged for linear sliding movement with respect to the valve body 35 and is provided with a resilient valve face 39 for sealing against the seat 37. An annular groove 40 is formed around the valve member 38 adjacent the valve face 39 and a latching mechanism includes a peg 41 spring-loaded to engage in that groove, as shown in FIG. 5. The latching mechanism has a release solenoid 42 which when energized withdraws the peg 41 from the groove 40, so freeing the valve member 38 to move to the left (in FIG. 5) under the action of a compression spring (not shown).

A setting solenoid 43 is arranged around the axis of movement of the valve member 38 and when energised, withdraws the valve member from a position where face 39 seals on the valve seat 37 to the position illustrated in FIG. 5 so permitting peg 41 to latch the valve member at the open position when solenoid 43 is de-energised again. A further groove 44 is formed in the valve member and provides a shoulder against which the peg 41 may engage when the valve member is in its closed position. This serves to prevent the valve member being moved to its open position when setting solenoid 43 is energised unless release solenoid 42 is also energised to withdraw peg 41.

The supply of energy to the two solenoids 42 and 43 is under the control of an immobiliser shown diagrammatically at 45. This immobiliser includes a data card reader into which a data card 46, serving as a key for the immobiliser, may be inserted. Unless such a key is inserted and the appropriate security codes entered in a manner known per se, the immobiliser will maintain immobilised a vehicle to which the fuel valve and immobilizer are fitted. Provided a key is inserted and the entered codes are recognised by the immobiliser, the immobiliser energises solenoids 42 and 43, to move the valve member 38 to the open position shown in FIG. 5.

The valve is provided with suitable sensors (not shown) so that a signal may be provided to the immobiliser indicative of the state of the valve. Then, in other respects the immobiliser may interface with the valve and the electrical systems of the motor vehicle as has been described above with reference to the first embodiment Operation thus corresponds to that which has previously been described and will not be described again here.

It will be appreciated that both embodiments employ passive arming but manual key-operated disarming. Enhanced security is in this way assured. An operator cannot fail to arm the system on leaving the vehicle, which is then protected by the fuel shut-off valve as well as the disabling of two separate electrical circuits. The key-operated setting mechanism requires the use of a security key to open the fuel valve and so should someone try to overcome the disabling of the electrical systems, the vehicle still cannot be driven.

We claim:

1. A fluid flow control value including a fluid passage in which is provided valve seat, a valve member and a spring urging the valve member to a closed position where the valve member seals against the valve seat, the valve further comprising a key-actuated setting mechanism arranged upon operation with a key to move the valve member away from the closed position to an open position, latch means to restrain the valve member in the open position when moved there by the setting mechanism, and electrically-operable release means for the latch means whereby operation of the release means frees the valve member to move under the action of the spring from the open position to the closed position.

2. A fluid flow control valve as claimed in claim 1, wherein the valve member is arranged for linear sliding movement towards and away from the valve seat.

3. A fluid flow control valve as claimed in claim 2, wherein the latch means comprises a plunger mounted for movement along a line substantially perpendicularly to the line of movement of the valve member, the plunger being engageable with the valve member.

4. A fluid flow control valve as claimed in claim 3, wherein the plunger is spring-urged to a position where the plunger is engaged with the valve member.

5. A fluid flow control valve as claimed in claim 4, wherein the release means comprises a solenoid arranged to act on the latch means.

6. A fluid flow control valve as claimed in claim 1, wherein the setting mechanism is operated by a lock mechanism having first and second positions, the key being restrained against withdrawal from the lock mechanism other than when the lock mechanism is at the first position, and movement of the lock mechanism from the first position to the second position serving to open the valve.

7. A fluid flow control valve as claimed in claim 1, wherein the setting mechanism is electrically operated, the supply of electrical energy thereto causing the valve member to move to its open position.

8. A fluid flow control valve as claimed in claim 7, wherein the supply of electrical energy to the setting mechanism is under the control of at least one of a key-operated switch and an immobiliser system requiring an appropriate key to permit the actuation thereof.

9. A fluid flow control valve as claimed in claim 8, wherein said appropriate key is in the form of a data carrier readable by the immobiliser system.

10. A fluid flow control valve as claimed in claim 1, wherein electrical contact means is provided to detect manual opening of the valve thereby to control the operation of an external circuit.

11. A fluid flow control valve as claimed in claim 10, wherein the setting mechanism is operated by a lock mechanism having first and second positions, the key being restrained against withdrawal from the lock mechanism other than when the lock mechanism is at the first position, movement of the lock mechanism from the first position to the second position serving to open the valve, and wherein there is provided further contact means to detect return of the key to the first position or removal of the key, following opening of the valve with the key.

12. A fluid flow control valve as claimed in claim 10, in combination with an immobilising system for a motor vehicle, the immobilising system being activated by the contact means detecting the opening of the valve then to permit the operation of a vehicle to which the combination is connected.

13. In combination with a vehicle powered by an internal combustion engine, a fluid flow control valve as claimed in claim 1, wherein the fluid flow control valve is connected in the fuel line from the fuel tank to the engine thereby to control the flow of fuel to the engine.

14. A combination as claimed in claim 13 and including an immobilising system connected to the electrical system of the motor vehicle, the immobilising system being activated by contact means detecting the opening of the valve then to permit the operation of the vehicle electrical systems.

15. A combination as claimed in claim 13, wherein the electrically-operated release means is powered to release the latch means by an activity associated with leaving the vehicle.

16. A combination as claimed in claim 15, wherein said activity comprises one or more of turning off the ignition supply to the engine, closing all of the doors of the vehicle with the engine turned off, and locking the doors of the vehicle.

17. A combination as claimed in claim 13, wherein the immobilising system serves to disable at least two primary electrical circuits of the vehicle.

18. A method of protecting against theft a vehicle powered by an internal combustion engine, comprising installing in the fuel line to the engine a fluid flow control valve as claimed in claim 1 and having open and closed positions, the fluid flow control valve having a key-actuated setting mechanism for opening the valve and electrical release means to close the valve, and connecting the electrical release means to the vehicle electrical systems so as to be energised automatically upon the vehicle being left unattended.

19. A method as claimed in claim 18, wherein a vehicle electrical immobilising system is connected to the electrical circuits of the vehicle and is arranged to detect the opening of the valve by use of the key so as then to allow operation of the vehicle.

20. A fluid flow control valve including a fluid passage in which is provided a valve seat, a valve member and a spring urging the valve member to a closed position where the valve member seals against the valve seat, the valve further comprising a setting mechanism arranged upon operation to move the valve member away from the closed position to an open position, the setting mechanism including a key-operated lock mechanism having first and second positions, the key being restrained against withdrawal from the lock mechanism other than when the lock mechanism is at the first position, and movement of the lock mechanism by the key from the first position to the second position serving to move the valve member to said open position, latch means to restrain the valve member in the open position when moved there by the setting mechanism, and electrically-operable release means for the latch means whereby operation of the release means frees the valve member to move under the action of the spring from the open position to the closed position.

21. A fluid flow control valve as claimed in claim 20, wherein the setting mechanism is electrically operated, the supply of electrical energy being under the control of the lock mechanism and causing the valve member to move to its open position.

22. A fluid flow control valve as claimed in claim 21, wherein the supply of electrical energy to the setting mechanism is additionally under the control of an immobiliser system requiring an appropriate key to permit the actuation thereof.

23. A fluid flow control valve as claimed in claim 22, wherein first electrical contact means is provided to detect manual opening of the valve and second electrical means is provided to detect return of the key to the first position or removal of the key, following opening of the valve with the key.

24. A fluid flow control valve as claimed in claim 23, in combination with an immobilising system for a motor vehicle, the immobilising system being activated by the contact means detecting the opening of the valve then to permit the operation of a vehicle to which the combustion is connected.

25. The combination of a vehicle and a fluid flow control valve as claimed in claim 20, which vehicle has an internal combustion engine, a fuel tank and a fuel line from the tank to the engine, and the fluid flow control valve is connected in the fuel line from the fuel tank to the engine thereby to control the flow of fuel to the engine.

* * * * *